Feb. 19, 1957   R. M. GRAY   2,781,552
PROCESS FOR MAKING THIN ARTICLES OF POLYTETRAFLUOROETHYLENE
Filed Oct. 21, 1955   2 Sheets-Sheet 1
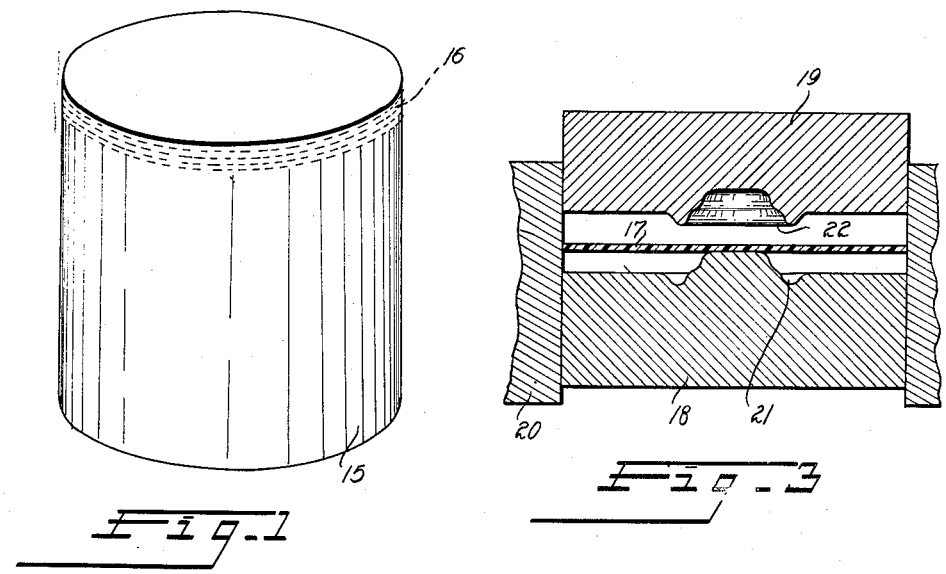
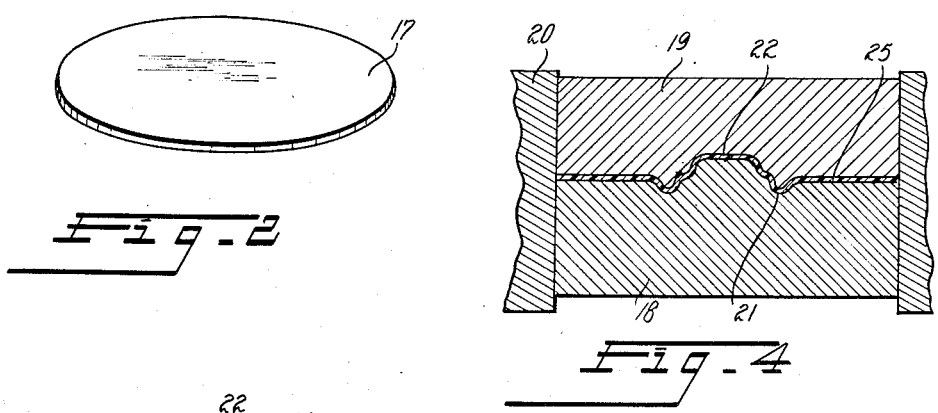
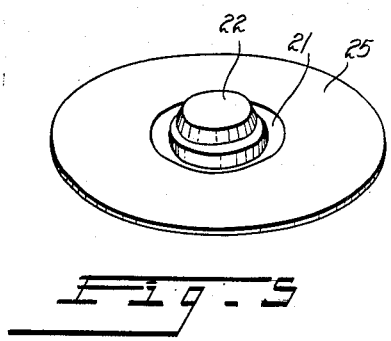
INVENTOR
ROLAND M. GRAY
BY
ATTORNEYS Feb. 19, 1957 R. M. GRAY 2,781,552
PROCESS FOR MAKING THIN ARTICLES OF POLYTETRAFLUOROETHYLENE
Filed Oct. 21, 1955 2 Sheets-Sheet 2
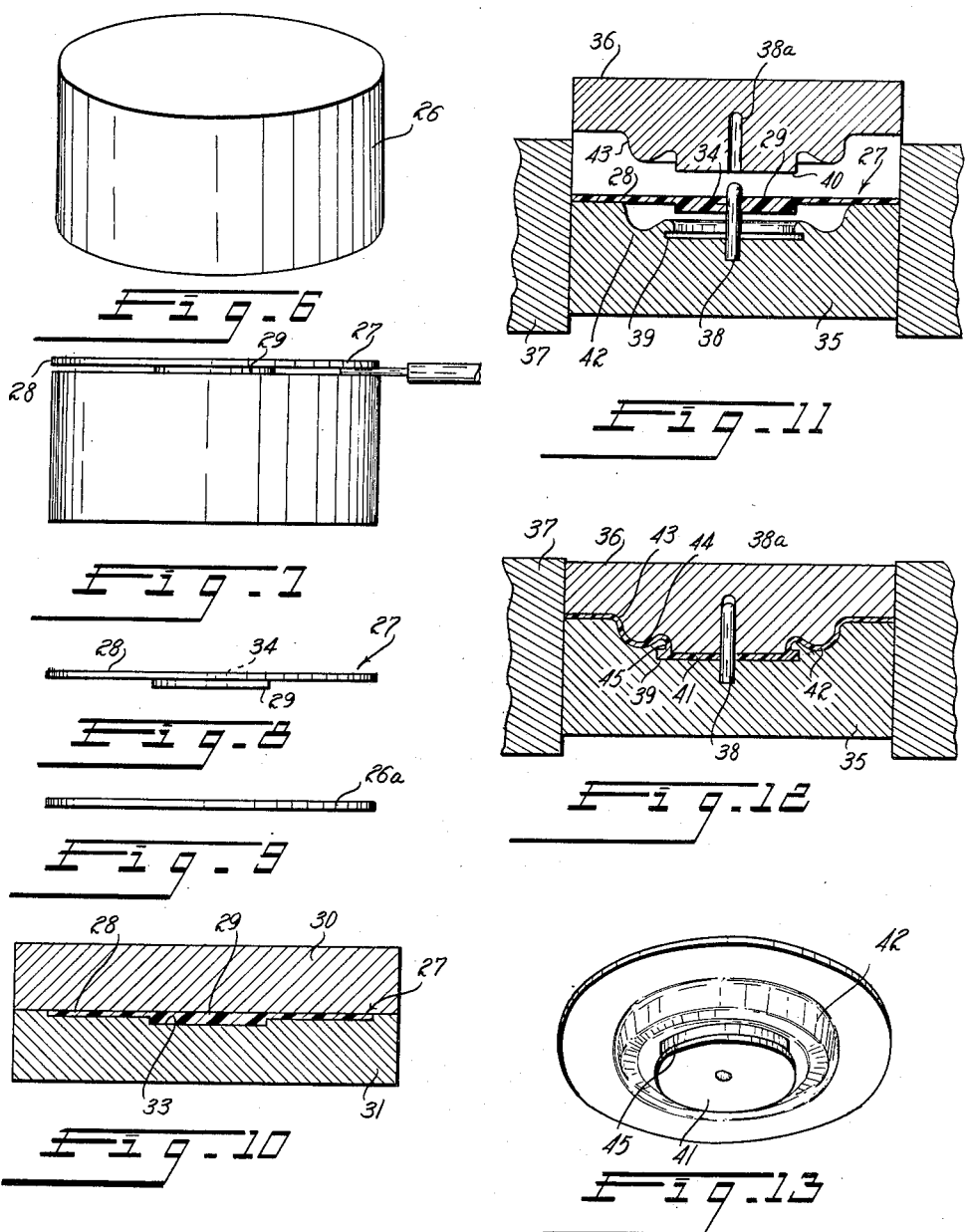
INVENTOR
ROLAND M. GRAY
BY
ATTORNEYS

2,781,552
PROCESS FOR MAKING THIN ARTICLES OF POLYTETRAFLUOROETHYLENE

Roland M. Gray, Newark, Del., assignor to United States Ceramic Tile Company, East Sparta, Ohio, a corporation of Delaware Application October 21, 1955, Serial No. 608,416
(Filed under Rule 47(b) and 35 U. S. C. 118)

6 Claims. (Cl. 18—55)

The invention relates to a process for the fabrication of polytetrafluoroethylene articles, and more particularly to a process for forming articles of relatively thin cross section, that is, articles having a thickness of 1/16" or less.

Polytetrafluoroethylene is described in U. S. Patent No. 2,230,654 and when the present invention was made was available commercially as a white or brown granular powder about 30 to 50 mesh in size. It is a polymeric material, highly resistant to corrosion and oxidation and has high dielectric properties. It has anti-friction properties and is non-adhesive and non-absorbent. Because of the above properties as well as the ability to withstand considerably higher temperatures than many other plastic materials, polytetrafluoroethylene has many useful applications but other properties have limited the forms in which articles of polytetrafluoroethylene can be economically produced.

Polytetrafluoroethylene is generally considered a thermoplastic resin but it does not melt and flow as do conventional thermoplastic materials. At normal temperature, it has a crystalline or fibrous structure but it changes to an amorphous gel state at temperatures above about 621° F. In general, polytetrafluoroethylene articles are made by a cold forming operation followed by baking or sintering. The cold forming is usually done by pressing the powder at room temperature under a pressure of 2,000 to 10,000 pounds per square inch and the resulting preform is then baked or sintered at a temperature of about 700° to 740° F. until the entire piece has reached the gel state. The article is then cooled. Depending upon the size and shape of the article, and the dimensional tolerance required, cooling may take place either in air or in a mold.

There are many uses for polytetrafluoroethylene articles of thin cross section such as valve and shaft seals, gaskets, diaphragms and the like. Often these articles must have intricate shapes and must be held to close tolerances over a wide range of temperatures and prior to the present invention the only methods for forming such articles were so slow and costly as to be impractical for mass application.

When the present invention was made, there was no known method for making articles of thin cross section from polytetrafluoroethylene in an economical manner. The entire teaching in the art was that it was impossible to mold thin articles of complex shape and that any substantial deformation of polytetrafluoroethylene in the gel state would fracture the gel causing cracks which would not reweld.

It is not practical to press thin articles (1/16" and less) directly from molding powder. Polytetrafluoroethylene has a compression ratio of about 4 to 1 and when thin articles are to be made, the layer of molding powder must also be thin. Because of the particle size of the powder, about 30 to 50 mesh, it is almost impossible to form thin, uniform layers of the powder and unless the powder layer is uniform, a non-uniform pressing will result.

In the gel state, polytetrafluoroethylene cannot be molded by the techniques ordinarily employed with thermoplastic resins. The sole manufacturer of polytetrafluoroethylene, E. I. du Pont de Nemours & Co., in Information Bulletin No. x–7 entitled "Teflon" states:

"However, even at high temperature the material does not flow under ordinary mold pressures, to the extent necessary to fill mold recesses, and if flow is forced by extreme pressure, slippage within the piece produces cracks which do not reweld."

In another publication entitled "Du Pont Teflon Tetrafluoroethylene Resin" (copyright 1954) it is stated on page 5:

"In the gel phase, 'Teflon' will not flow to any great extent, and only limited deformation can be achieved without fracturing the gel."

After sintering and before the article has cooled to the crystalline state, polytetrafluoroethylene may be shaped to some extent by an operation known as "coining." In this operation, the article while still in the gel state is placed in a heated die and held under pressure until the article cools to about 100° F. This process is usually employed in making articles to close tolerances or for modifying surface configuration. While there is some material flow, the flow is small to avoid fracture of the gel.

Further, polytetrafluoroethylene has the property of plastic "memory," that is, when heated, it tends to return to the shape in which it was originally pressed and sintered. For this reason, the accuracy and reliability of articles formed of polytetrafluoroethylene depend to some degree on the history of the material.

Sheet material is usually made by forming a cylinder of pressed and sintered polytetrafluoroethylene and shaving a thin sheet from the cylinder in much the same manner that veneer is shaved from a log. The resulting sheet, while flat, tends to return to its original spiral shape because of the plastic "memory" of the material. As a result, articles formed of such sheet material will tend to curl and change shape at elevated temperatures.

Polytetrafluoroethylene has the further property of cold flow and this property is apparently increased to some extent at elevated temperatures below the gelling temperature of about 621° F. Polytetrafluoroethylene articles may thus be shaped to a relatively small degree by heat and pressure by cold flow but high pressures, about 6000 lbs./sq. in., are required. Cold pressed articles of polytetrafluoroethylene cannot be made to close dimensions because of the tendency of the material to spring back and when the pressed piece is heated, plastic memory makes the piece tend to return to its former shape.

Polytetrafluoroethylene has two other properties which are important with respect to the present invention. The material has a relatively low heat conductivity and a relatively high thermal coefficient of expansion. Thick pieces cooled rapidly from the gel state solidify and shrink quickly at the surface while the center remains expanded and in the frangible gel state. As a result, the manufacturer of polytetrafluoroethylene has stated that since the material is a good insulator of heat, rapid cooling will result in uneven shrinkage "and may cause a variation in density throughout the piece and cracks in the center of the molding." The manufacturer therefore recommends slow cooling "from the sintering temperature to about 100° F." (Du Point Teflon Tetrafluoroethylene Resin, copyright 1954, page 24.)

Because of the inherent properties of the material, it has been difficult and expensive to form thin shaped articles of polytetrafluoroethylene which are accurate and which will not change shape at elevated temperatures.

To meet exacting requirements, it has sometimes been necessary to machine intricate forms from a thick piece of sintered polytetrafluoroethylene. This procedure involved not only the expense of machining but also the waste of costly raw material and very thin pieces are impossible to machine.

I have found that thin sheets of sintered polytetrafluoroethylene may be molded into accurate and complex shapes involving substantial flow of material and one of the principal objects of the present invention is to provide a novel method of molding polytetrafluorethylene.

Another object of this invention is to provide for the practical manufacture of articles from polytetrafluoroethylene of very thin cross section, that is under .0625" in thickness.

Another object of the invention is to provide a method for the manufacture of thin cross sections under approximately .0625" in thickness and to keep all tendency toward thermal expansion or plastic "memory" in the direction which will do little or no harm in its application, and to provide that any and all tendency in that direction may be accommodated for, to permit satisfactory performance.

A still further object is to provide an economical method of producing from polytetrafluoroethylene formed shapes of thin cross section having undercuts or return recesses.

The above objects together with others which will be apparent from the drawings and following description, or which may be later referred to, may be attained by carrying out the improved method in the manner hereinafter described in detail and illustrated in the accompanying drawings, in which:

Figure 1 is a perspective view of a bar, rod or cylinder of polytetrafluoroethylene which may be produced by usual preforming and sintering or extrusion methods;

Figure 2 is a perspective view of a thin slice or disc which may be sliced from the end of the bar, rod or cylinder shown in Figure 1;

Figure 3 is a cross sectional view through a pair of forming dies within a die box, showing a heated slice or disc of polytetrafluoroethylene in the dies preparatory to forming to desired shape;

Figure 4 is a view similar to Figure 3 showing the dies in closed position with the formed shape article of polytetrafluoroethylene therein;

Figure 5 is a perspective view of the finished article;

Figure 6 is a perspective view of a bar of polytetrafluoroethylene from which a blank for producing a formed shape having an undercut or return recess may be produced;

Figure 7 is a side elevation showing a blank being cut from the bar;

Figure 8 is an edge elevation of the blank or partially completed product which may be made from the bar shown in Figures 6 and 7;

Figure 9 is an edge elevation of a disc or slice of polytetrafluoroethylene for forming the blank or partly finished product of Figure 8 by a modified procedure;

Figure 10 is a cross sectional view of a pair of dies, showing the manner in which the blank shown in Figure 8 may be produced by molding;

Figure 11 is a cross sectional view through a pair of forming dies and die box, showing the dies in open position with a heated blank as shown in Figure 8 placed within the dies preparatory to forming a shaped article having a recess or undercut portion;

Figure 12 is a view similar to Figure 11 showing the dies of Figure 11 in closed position with the formed undercut article in place; and Figure 13 is a perspective view of the article with undercut or recess portion formed therein.

The present invention relates particularly to the molding of thin articles of polytetrafluoroethylene and especially to articles having a cross-sectional thickness of 1/16" (0.0625") or less. Articles up to 1/8" (0.125") may be molded by the present process but as the thickness increases, the uniformity of the molding decreases and the range of permissible shapes becomes more limited. The process of the present invention is principally applicable to articles having a cross sectional thickness of 0.0625" or less and has been used to form articles as thin as 0.006".

According to the present invention, articles can be molded from thin blanks of polytetrafluoroethylene into shapes in which portions are displaced from the plane of the original blank. Such displacement involves spreading or stretching the material in some areas and compressing it in other areas. Articles have been made by the present process in which parts of a thin blank have been displaced by 2" or more from the original plane of the blank and the polytetrafluoroethylene has been made to flow distances up to about 1/4".

Attempts to obtain equivalent displacement by the coining process would result in fracture of the gel and attempts to obtain equivalent displacement by the cold flow process would be impossible because of spring back or memory return, especially if the molded article is subject to elevated temperatures. The present process exceeds the performance of the coining and cold flow techniques while avoiding the disadvantages and limitations of both.

Broadly, the present invention involves heating a thin blank of sintered polytetrafluoroethylene to the gel state and then, while the material is still in the gel state, pressing it quickly in a cold die. The material passes almost instantly from the frangible gel state to the tough crystalline state while subjected to molding pressure and, since the material is thin, this transition is substantially uniform and simultaneous throughout the piece. Substantial displacement of the material and actual injection of the material into die recesses can be obtained and the resulting article is uniform and free from cracks. Sometimes in complex shapes, the cross section at a particular point may be greater than 1/16" but heat should not have to pass through more than about 0.035" of polytetrafluoroethylene at any point.

In general, the blank should always be in the gel state when placed in the mold. However, it is possible to mold pieces which are just below the gel state when other conditions require. For example, a blank sliced from a preform has a smooth surface where sliced but when heated above the gel temperature the surface becomes rough due to plastic memory of particles distorted in slicing. The smooth, sliced surface can be retained and the blank molded if it is heated almost to the gel temperature, about 605° F., plus or minus 5° or 10° F. However, it is always preferable to heat the blank to the gel temperature where possible and in all other cases, the blank should be as close as possible to the gel temperature.

The present invention may be used with pure polytetrafluoroethylene or with polytetrafluoroethylene containing a filler such as metal, carbon, silica or the like. In carrying out the invention a preform, such as a rod, cylinder, tube or block is formed by cold pressing and sintering, by extrusion or in any other known manner. It is preferable that the preform be sintered and cooled free, that is, without pressure, since pressure sets up strains in the material and, if such strain is present in the final molded article, plastic memory will cause distortion of the article, especially if the article is heated.

While sheets may be shaved from the cylindrical surface in the same manner as veneer is shaved from a log, it is preferable to cut slices transversely to the axis of the cylinder so as to minimize the effects of plastic "memory" of the material. Sheets which are shaved from a cylinder like veneer tend to return to their spiral form and to elongate in the direction of curvature when heated while sheets cut transversely of the cylindrical axis tend to return to a flat condition and usually the mechanical mounting is sufficient to restrain this tendency.

The thin blank cut from the sintered preform is heated to a temperature preferably above or at least very close to the gelling temperature. In actual practice, temperatures of 605° F. (plus or minus a reasonable tolerance such as 5° F. or 10° F.) or more may be used depending upon the thickness of the section, the filler if any, and the surface finish desired. Near the gel temperature, the material becomes sufficiently soft to permit substantial displacement and accurate forming by pressure and at about 621° F. the material passes into the gel state although it retains its physical form to much higher temperatures. The upper temperature to which the blank may be heated is not critical but at higher temperatures, the polytetrafluoroethylene vaporizes and material may be lost. Ordinarily the blank is not heated above about 700° F.

After the blank has been heated to the proper temperature it is removed from the oven, placed immediately in the die and pressed to the desired shape. The thin blanks and slices are preferably heated between flat plates of metal or the like and are kept between these plates until placed in the die. These plates minimize loss of heat from the blank and when the plates are not used, the blank may cool unevenly between the oven and the die and this unequal cooling will set up strains in the molded article. Such strains cause distortion if the article is subsequently heated.

The dies are substantially below the gel temperature and are preferably at about room temperature, about 70° F. Cooling means is usually provided to maintain the dies at low temperature.

The dies are closed as soon as the hot blank is placed in them and sufficient pressure is applied to force the blank to assume the shape of the die cavities. The dies are kept closed under pressure until the polytetrafluoroethylene has cooled to the crystalline state after which no substantial change in shape takes place. Since the dies are already cold, this cooling of the material is quite rapid and after cooling, the molded article can be removed from the dies.

Referring now more particularly to the method disclosed in Figures 1 to 5, a bar, rod or cylinder of polytetrafluoroethylene, as indicated generally at 15 in Figure 1 is first cold pressed from polytetrafluoroethylene powder under sufficient pressure to produce a hard, substantially rigid article having a cross section of the general size and shape of the blank to be sliced therefrom. In the event that a ring shaped blank is desired, the original pressing could be of tubular form. After pressing, the article 15 is placed in an oven at sintering temperature, preferably 690° to 700° F., for sufficient length of time to bring all portions of the article up to the sintering temperature and the article is then cooled.

The article 15 is frequently 3″ or more in diameter and when the present invention was made, it was the teaching in the art that articles of this size should be sintered in the mold and cooled under pressure. I have found, however, that when the preformed article 15 is to be sliced into thin sheets for subsequent molding, it is preferable to sinter and cool the preform free of pressure. Sintering and cooling free of pressure results in a preform substantially free from internal strain so that articles molded from such preforms do not distend when heated.

After the sintered article has been removed from the oven and cooled, it is preferably sliced transversely into thin slices, disks or rings of substantially the diameter and thickness desired in the finished article, the article 15 being preferably sliced transversely from end to end as indicated by the dotted lines 16 in Figure 1. These slices are preferably cut from the cylinder 15 by a sharp blade so that there is no waste of the expensive material in forming the blanks or slices. Thin discs or slices as indicated at 17 in Figures 2 and 3 are thus produced, each being of substantially the diameter and thickness desired in the finished article. It must be understood of course that if the finished article is to be of some polygonal or any irregular shape, the bar or rod 15 may be formed of that cross sectional shape instead of cylindrical as shown, so that the thin slices will have the desired shape.

The blank thus formed is then placed in an oven and heated to a temperature where the material becomes soft or of a gelatinous character. In actual practice this temperature is not less than about 605° F. and preferably above about 621° F.

It is desirable to keep the temperature at not over 700° F. because of the tendency of polytetrafluoroethylene to vaporize, and as the temperature is increased the vaporization becomes more rapid, so that if held above 700° F. for any considerable time a portion of the material is lost by vaporization.

The heated disk or blank 17 is then placed between the lower and upper forming dies 18 and 19 mounted within a die box 20, as shown in Figure 3. These dies have cavities 21 and 22 shaped to produce the finished article of desired shape. The dies are ordinarily at or near room temperature but are always well below the gel temperature of the polytetrafluoroethylene. Cooling means are generally provided to maintain the dies at low temperature.

As soon as the heated blank is inserted, the dies are immediately closed as indicated in Figure 4, producing the finished article 25 of thin cross section as shown in Figures 4 and 5. Pressures from 1500 to 20,000 p. s. i. may be used. Because the dies are relatively cold, the formed article cools almost instantaneously to the crystalline state and regains its full tensile strength. Because cooling is very rapid, the finished article may be removed from the mold after a short period and rapid production is thus possible.

In Figures 6 to 13 is illustrated a method of forming a thin, shaped article having an undercut or return recess. In order to produce such an article, a cylinder or bar 26, as shown in Figure 6, may be produced in the manner above described with reference to the cylinder or bar 15. A blank 27 may then be cut from one end of the cylinder 26, as indicated in Figure 7. This blank 27, as best shown in Figure 8, comprises the relatively thin disk portion 28 with a thicker central hub portion 29.

The blank 27 may also be formed by cutting a slice or disk of the material as shown at 26a in Figure 9, this disk having a thickness slightly greater than that required in the finished article. The disk 26a is then placed in an oven and heated until it becomes soft and gelatinous about 621° F. or above. This heated disk is then placed between upper and lower cold dies 30 and 31, having cavities 32 and 33 shaped to produce the blank 27 and a thickened hub portion 29. If desired, a central aperture 34 may be formed through the blank at any stage in the process. After the blank has cooled to a point below the gel temperature, the dies 30 and 31 are opened and the blank 27 removed.

Whether formed by machining or hot pressing as above described, the blank is then placed in an oven and heated for final pressing. It is then removed from the oven and immediately placed in suitable forming dies 35 and 36, as shown in Figure 11.

The temperature to which the blank 27 may be heated for final pressing will be governed by the manner in which the blank was formed. If the blank 27 is formed by slicing, as in Figure 7, it may be heated to a temperature considerably above the gelling temperature without any concern. If, however, the blank 27 is formed in the manner indicated in Figure 10, it must be kept below the gel temperature because above this temperature, the plastic "memory" of the material would cause it to return to the form of Figure 9.

Dies 35 and 36 are preferably located in a die box 37 in order to maintain the diameter of the finished article. A central aperture 34 may be formed in the blank 27 to assist in properly centering the same in the dies by the use of the pin 38 in the lower die 35, and corresponding opening 38a in the upper die 36. However, it will be obvious that in cases where an imperforate diaphragm is desired, the pin 38a would be omitted.

The dies 35 and 36 have cooperating faces shaped to the contour of the finished article, the lower die 35 having a reentrant groove 39 at its central portion while the upper die 36 has a depending central plunger portion 40 adapted to contact the hot blank 27 before the remainder of the upper die surface.

With this arrangement, when the dies are closed under suitable pressure, as shown in Figure 12, the thickened central portion 29 of the blank 27 will be reduced in thickness forming the flat diaphragm 42 as shown in Figure 12 thereby forcing a portion of the material into the undercut recess 39 of the lower die, which is in effect a form of injection molding. The thin disk portion 28 of the blank 27 is simultaneously formed to the desired shape between the contacting faces 42 and 43 of the dies 35 and 36 respectively, producing the shaped article 44 with the peripheral groove or reentrant recess 45 as shown in Figures 12 and 13. The particular article shown in the drawing is designed for use as a diaphragm in a pump or the like. When required, one or both parts of the dies may have retractable parts to permit release of the finished article.

The article 25 shown in Figures 4 and 5 as now being manufactured has a thickness of about .013″ and the article 44 shown in Figures 12 and 13 is being manufactured in a thickness of about 0.015″.

From the foregoing it will be apparent that I am able to attain the objects of my invention and provide a process for molding thin articles of polytetrafluoroethylene which are uniform and free from cracks. By my process, contrary to the teaching of the art, substantial displacement of the material is obtained, the effects of plastic "memory" are minimized, waste of material is avoided, and rapid, economical production can be obtained. It is apparent that various modifications can be made without departing from the spirit of the invention or the scope of the appended claims.

This application is a continuation-in-part of my prior application Serial No. 323,685, filed December 2, 1952.

I claim:

1. The method of forming shaped articles of polytetrafluoroethylene which comprises cutting a flat blank not exceeding 1/16 inch in thickness from a preform of pressed and sintered polytetrafluoroethylene, heating said blank to gel temperature and pressing said heated blank while at not substantially less than gel temperature in dies which are at a temperature substantially below the gel temperature.

2. The method of forming shaped articles of polytetrafluoroethylene which comprises pressing a preform of polytetrafluoroethylene molding powder, sintering and cooling the preform substantially free from pressure, slicing a flat blank less than 0.0625″ thick from the preform transversely of the axis of the preform, heating the blank to substantially the gel state, and pressing the blank while at the gel state in cold dies to finished shape.

3. The method of forming shaped articles of polytetrafluoroethylene as described in claim 2 including maintaining said blank at substantially uniform temperature until it is placed in the mold.

4. A process for fabricating articles of polytetrafluoroethylene which comprises pressing polytetrafluoroethylene powder into a preform, heating said preform at a temperature above 621° F. and below 750° F. until said preform is sintered throughout, cooling the resulting sintered preform, cutting a slice of less than .0625 of an inch from said preform, heating said slice to a temperature above 605° F., pressing said heated slice to desired shape by bending to displace the entire cross section of portions thereof entirely out of the normal plane of the slice and relocating said portions in planes spaced from said normal plane in closed dies maintained at a temperature substantially less than 605° F. and cooling the slice in the dies.

5. A process for fabricating articles of polytetrafluoroethylene which comprises pressing polytetrafluoroethylene powder into a preform having a cross sectional size and shape substantially the same as the periphery of the finished article, heating said preform at a temperature above 621° F. and below 750° F. until said preform is sintered throughout, cooling the resulting sintered preform, cutting a slice of less than .0625 of an inch from said preform, heating said slice to a temperature above 605° F., pressing said heated slice to desired shape by bending to displace the entire cross section of portions thereof entirely out of the normal plane of the slice and relocating said portions in planes spaced from said normal plane in closed dies and maintaining said dies at about room temperature.

6. A process for fabricating articles of polytetrafluoroethylene which comprises producing a flat relatively thin preformed body of sintered polytetrafluoroethylene having a thickened portion of less than .0625 of an inch, heating said body to a temperature of above 605° F., pressing said heated body to desired shape by bending to displace the entire cross section of portions thereof entirely out of the normal plane of the body and relocating said portions in planes spaced from said normal plane in closed dies having a reentrant groove into which said thickened portion is forced producing a reentrant recess in the shaped body and maintaining said dies at about room temperature.

References Cited in the file of this patent

UNITED STATES PATENTS

| | | |
|---|---|---|
| 2,456,262 | Fields | Dec. 14, 1948 |
| 2,602,962 | Deakin | July 15, 1952 |